United States Patent [19]

Hagiuda et al.

[11] Patent Number: 5,594,314
[45] Date of Patent: Jan. 14, 1997

[54] SECONDARY BATTERY DISCHARGE ADAPTOR

[75] Inventors: Nobuyoshi Hagiuda, Yokohama; Hideki Matsui, Fujisawa; Hiroshi Sakamoto, Kawasaki; Ryotaro Takayanagi, Yokohamashi, all of Japan

[73] Assignee: Nikon Corporation, Tokyo, Japan

[21] Appl. No.: 202,025

[22] Filed: Feb. 25, 1994

[30] Foreign Application Priority Data

Mar. 17, 1993 [JP] Japan ................................ 5-017867 U

[51] Int. Cl.$^6$ ................................................ H01M 10/46
[52] U.S. Cl. ........................ 320/2; 320/5; 320/6; 320/13
[58] Field of Search ................................. 320/2, 5, 6, 8, 320/9, 13, 15, 30, 48, 4, 14

[56] References Cited

U.S. PATENT DOCUMENTS

| | | |
|---|---|---|
| 3,959,706 | 5/1976 | Mabuchi et al. ........................ 320/5 X |
| 4,691,158 | 9/1987 | Hashimoto et al. ..................... 320/4 X |
| 4,714,868 | 12/1987 | Maruyama et al. ......................... 320/5 |
| 5,196,779 | 3/1993 | Alexandres et al. ...................... 320/14 |
| 5,280,229 | 1/1994 | Faude et al. .................................. 320/2 |
| 5,355,072 | 10/1994 | Satsuma et al. ........................... 320/13 |

Primary Examiner—Edward H. Tso
Attorney, Agent, or Firm—Oliff & Berridge

[57] ABSTRACT

A discharging adaptor connects between an existing recharging unit and a battery, discharges the battery and, automatically recharges the battery after discharging is complete. The adaptor also indicates the battery's remaining capacity. The battery discharging adaptor connects between a battery and its recharging unit and is equipped with a load-discharging circuit for discharging the battery, a mechanism for connecting the battery to the load-discharging circuit when power is added, a mechanism for detecting when the battery is almost completely discharged, and a regulator for connecting the battery to the recharging unit, based on the output of the discharge detecting system.

32 Claims, 4 Drawing Sheets

SECONDARY BATTERY DISCHARGE ADAPTOR

BACKGROUND OF THE INVENTION

1. Field of the Invention

This invention relates to a secondary battery discharge adaptor and more particularly to a discharge adaptor used for completely discharging ni-cad and other similar secondary batteries designed for repeated usage (referred to hereafter simply as "batteries") prior to recharging of the batteries.

2. Description of Related Art

Ni-cad and similar secondary batteries are widely used as power sources for battery-operated machines, generally because they can be used repeatedly through recharging. This type of battery has its charge-carrying capacity diminished when regularly recharged without first being fully discharged, known as "the memory effect." This type of battery is also not rechargeable to 100% capacity after prolonged periods of neglect or non-use. This is known as, "deactivation."

Currently, in order to solve the problems of the memory effect and of deactivation, devices are being marketed which first fully discharge the batteries prior to recharging and then recharge them.

However, although problems such as the memory effect and deactivation can be avoided if one has a recharging unit which recharges only after completely discharging the batteries, as described above, these problems cannot be solved if the recharging unit a purchaser or user already has is not equipped with these functions, and purchasing a new recharging unit having a discharging function brings the inconvenience of an additional, large financial burden.

As an alternative solution to the problems mentioned above, there are adaptors available which connect an appropriate load to the batteries and discharge the remaining charge, but these only discharge the batteries, and are inconvenient because the batteries must be connected to the recharging unit after discharging is completed.

SUMMARY OF THE INVENTION

The present invention provides a secondary battery discharge adaptor that connects to an existing, non-discharge recharger providing the recharger with the discharge function, and which causes the recharger to recharge automatically when discharging has been completed, thus making possible the satisfactory usage of secondary batteries without an excessive financial burden.

In order to accomplish this objective, a secondary battery discharge adaptor is provided, which is connected between the batteries and the recharging unit. The adaptor is equipped with a load-discharge circuit that discharges the batteries; a discharge detector for detecting when the batteries are discharged, and a switch that connects the secondary batteries to the recharging unit, based on the output of the discharge detector.

The secondary battery discharge adaptor described above is installed in or connected to a recharging unit, and a prescribed battery is installed in or connected to the adaptor. When power is provided to a switch, such as an electromagnetic discharge commencement switch, the batteries are connected to the load-discharge circuit. When the discharge detector detects that the batteries are almost completely discharged, the regulatory device disconnects the batteries from the load-discharge circuit, based on the output of this discharge detector, and connects them to the recharging unit. In this way, charging is properly carried out after the batteries have been completely discharged.

BRIEF DESCRIPTION OF THE DRAWINGS

A preferred embodiment of the invention will be described in detail with reference to the following drawings wherein like elements bear like reference numerals, and wherein.

DETAILED DESCRIPTION OF PREFERRED EMBODIMENTS

Figure 1:
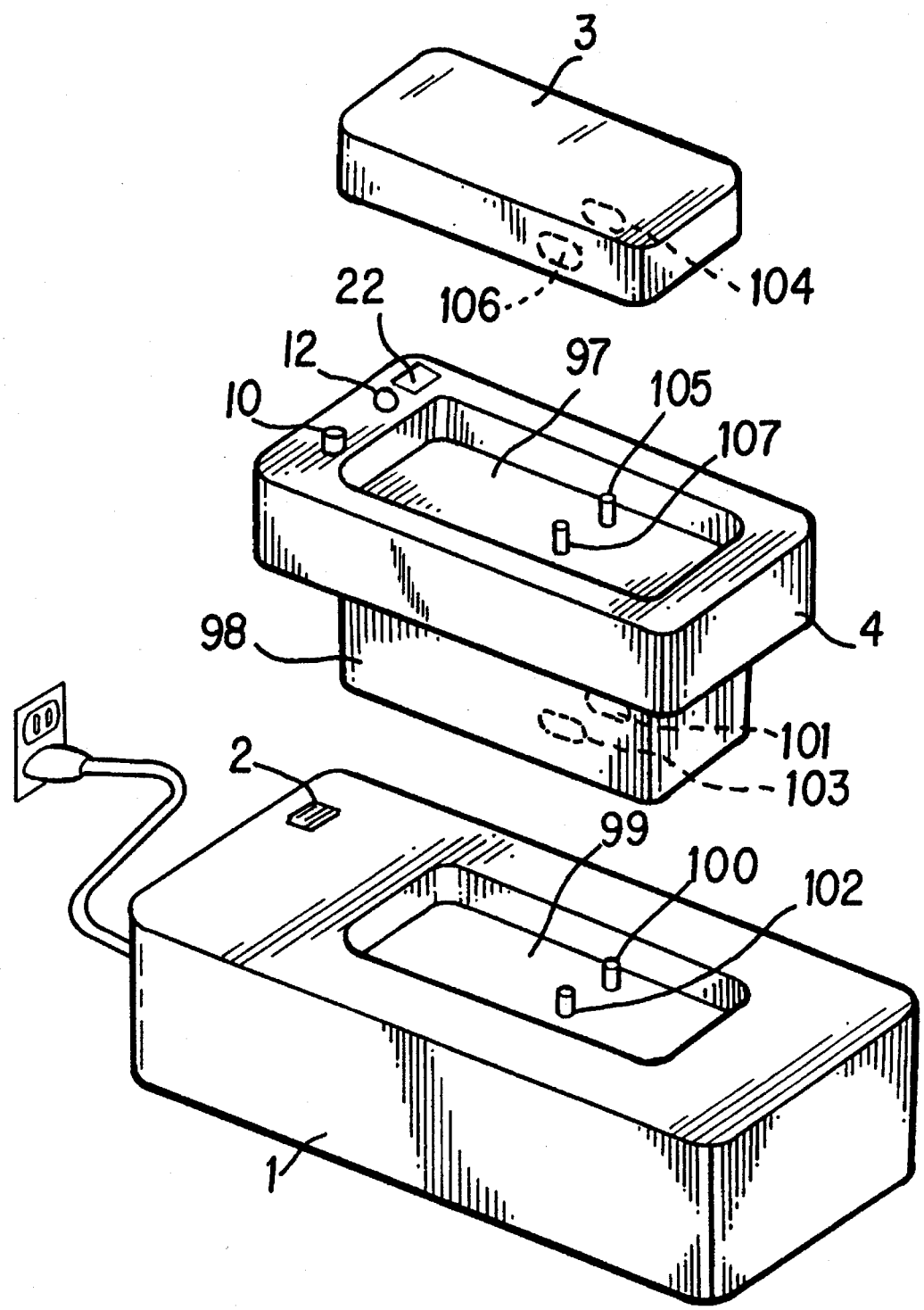
FIG. 1 is an explanatory figure showing the external appearance of the discharge adaptor of a preferred embodiment of this invention, as well as its usage.
Figure 2:
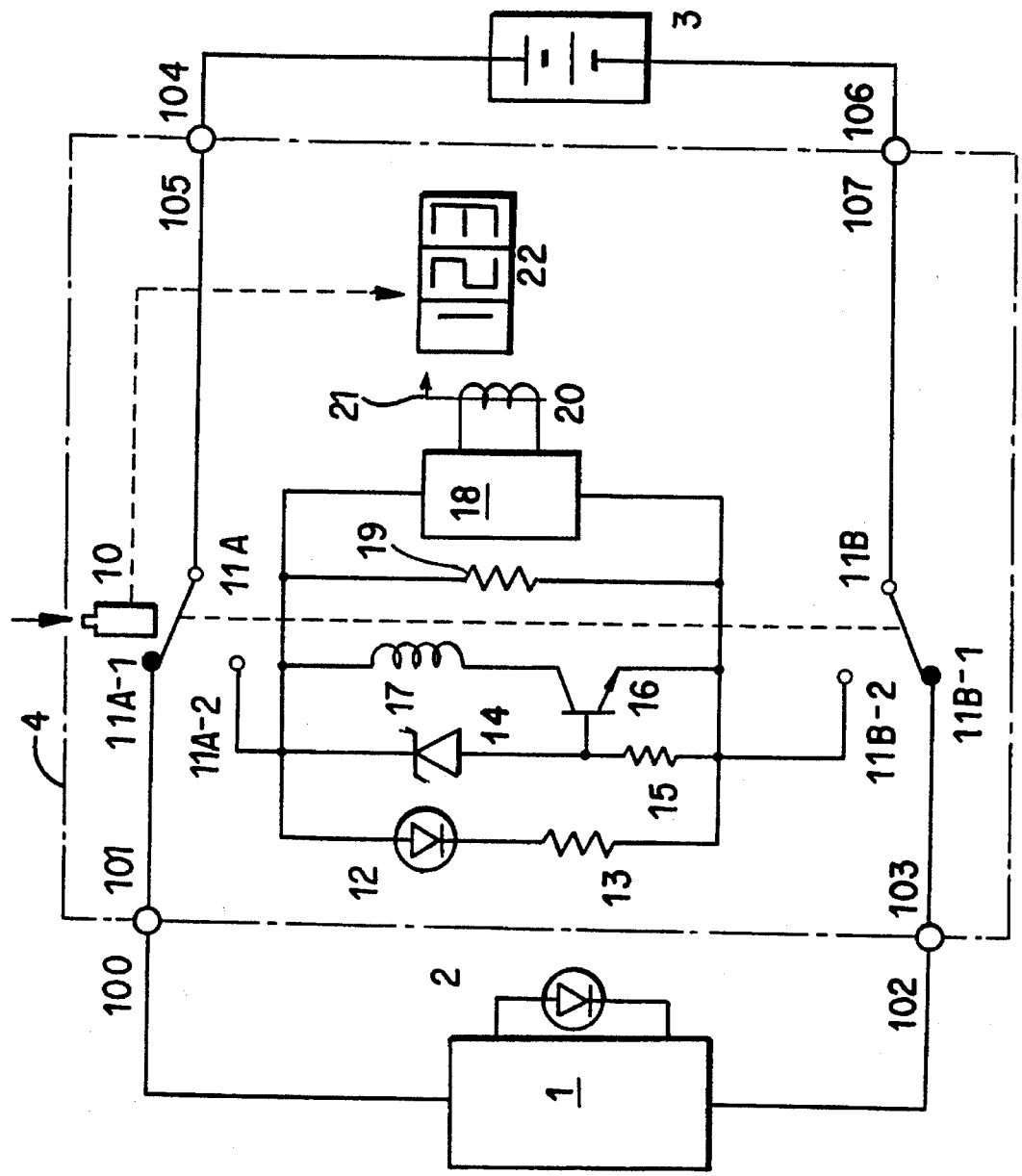
FIG. 2 is a circuit diagram of a preferred embodiment of the discharge adaptor shown in FIG. 1.

An actual example of the invention is described hereafter, with reference to the drawings. FIG. 1 shows the external appearance of an embodiment of the battery discharge adaptor provided by this invention. FIG. 2 shows the circuit diagram of the discharge adaptor of FIG. 1.

In FIG. 1, which shows a first embodiment of this invention, the secondary battery discharge adaptor 4, can be installed into the existing recharging unit 1, and the battery 3 can be installed into the adaptor 4. The recharging unit 1 is powered by an appropriate AC power source, and is constructed so that the battery 3 may be installed directly into the indentation 99 when not using the adaptor 4. In this case, the electrical connection with the battery 3 is made through the terminals of the recharging unit 100, 102 and the terminals of the battery 104, 106. The state of the charge is shown by the indicator 2, which blinks on and off while the battery is charging, and which stays constantly lit when charging is complete.

The discharge adaptor 4 has a protrusion 98 which fits into the indentation 99 in the recharging unit 1 which was originally designed for the battery 3. Terminals 101 and 103 are provided on the bottom side of the protrusion 98 to contact terminals 100 and 102 of the recharging unit 1. The discharge adaptor 4 also has an indentation 97, into which the battery 3 may be inserted. Terminals 105, 107 are provided in the bottom of the indentation 97, through which an electrical connection is established with the battery terminals 104, 106 when the battery 3 is inserted into the indentation 97. In this manner, the discharge adaptor 4 is constructed so that the recharging unit 1 and battery 3 may be mechanically and electrically connected and used together.

On the discharge adaptor are provided a discharge commencement button 10, an indicator lamp 12, and a counter 22 which numerically indicates the remaining capacity of the battery in terms of elapsed time. The movements and functions of these features are explained hereafter.

FIG. 2 displays the circuit diagram of the interior of the discharge adaptor. The circuit in FIG. 2 contains self-returning electromagnetic SPDT switches 11A, 11B, which are activated by the SPDT pushbutton 10. The contacts of the SPDT switches 11A, 11B are connected to the battery 3 by means of terminals 105 and 107, respectively, and contact points 11A-1 and 11B-1 are capable of connecting with the recharging unit by means of terminals 101 and 103, respectively. Terminals 11A-2 and 11B-2 are connected by a circuit, explained hereafter.

The discharge circuit contains a series circuit between contact points 11A-2 and 11B-2 which connects a Light-Emitting Diode LED which lights the indicator lamp 12 and a resistor 13. A similar series circuit is also provided between contact points 11A-2 and 11B-2 which connects a fixed-voltage diode, or zener diode 14, and a resistor 15. Further, this discharge circuit is equipped with a transistor 16 and a coil 17 for the electromagnetic switch. The transistor 16 emitter is connected to contact point 11B-2, the collector being connected to one end of the coil 17, and the other end of the coil is connected to contact point 11A-2. Also, the base of the transistor 16 is connected to the connecting point of the zener diode 14 and the resistor 15. Electric discharge resistor 19 is connected between contact points 11A-2 and 11B-2, and a counter 18 is also connected between them. A plunger coil 20, which is driven by an electric pulse from the counter 18, pushes the movable contact 21, which in turn engages the sending button of the meter, 'counting-up' the display.

An explanation is provided hereafter of the operation of the discharge adaptor described above, with reference to FIG. 2. SPDT switches 11A and 11B are initially set so that the movable contact points are contacting points 11A-1 and 11B-1. In this state, the recharging unit 1 is connected to the battery 3, and the battery 3 is recharged.

The movable contact points are manually changed from 11A-1 to 11A-2 and from 11B-1 to 11B-2, simultaneously, by pushing the discharge commencement button 10.

When the discharge commencement button 10 is pushed, the battery 3 is electrically disconnected from the charging unit and connected to the discharge circuit. In other words, when the movable contact points of SPDT switches 11A and 11B switch from 11A-1 and 11B-1 over to 11A-2 and 11B-2, respectively, electric current flows through resistor 13 into the LED 12 and the LED lights, indicating that electricity is being discharged.

While there is still sufficient voltage in the battery 3, current flows through the zener diode 14 and into the base of the transistor 16 and through the transistor 16. The electromagnetic switch coil 17 conducts electricity, and SPDT switches 11A and 11B are self-maintained at positions 11A-2 and 11B-2, respectively, through electromagnetic force. The battery 3 electrically maintains this connection with the discharge circuit even after the discharge commencement button has been manually released. In this condition, most of the current from the battery 3 is consumed by resistor 19.

When the movable contact points of SPDT switches 11A and 11B switch to 11A-2 and 11B-2, respectively, and the flow of electric current begins, the timing action of the counter 18 begins. An electric pulse is sent at fixed intervals to the plunger coil 20, and the movable contact 21 is moved. The contact 21 engages the sending button of the meter (not shown), and causes the display to count up. Thus, while the battery 3 is discharging, the meter indicates the elapsed time. Hence, if the numerical display of the meter 22 is set to correspond one-to-one with the value of remaining electric capacitance, the remaining capacity of the battery 3 will be indicated by the meter.

When the charge on the battery 3 is almost completely discharged, the voltage of the battery drops, the flow through the zener diode stops, the electric current stops flowing to the base of the transistor 16, and the flow through the transistor is terminated. Thus, the flow of electric current through SPDT switches 11A and 11B is cut off. As a result, the movable contact points of switches 11A and 11B simultaneously switch from 11A-2 and 11B-2 to 11A1 and 11B1, respectively, and the discharge from the battery 3 ceases, the result of which is that the remaining capacity of the battery 3 is still displayed on the meter 22. The remaining capacity remains displayed on the meter until the next time the discharge commencement button is depressed.

When the movable contact points of SPDT switches 11A and 11B are switched to 11A-1 and 11B-1, the battery 3 is connected to the recharging unit 1 and the battery 3 is recharged, in addition to which the indicator lamp 2 shows that recharging has begun. When recharging is complete, the indicator lamp shows that recharging is finished, and one series of movements has been completed.

If, for example, the battery is not used for a long period of time and has become inactive, the operation of pushing the button after recharging is finished causing the battery to discharge may be repeated several times, and its capacity is measured with the capacity indicating meter 22. Through this action, if the numerical value displayed on the capacity indicating meter 22 displays a numerical value at or near the original value, it can be ascertained that the battery has been activated. Also, in determining whether or not the lifetime of the battery has expired, it can be determined easily by depressing the discharge commencement button once after the battery has been completely recharged, reading the numerical value on the meter, and comparing it to the original value. The discharge adaptor 4 may be modified so as to be capable of discharging more than one battery at a time.

Figure 3:
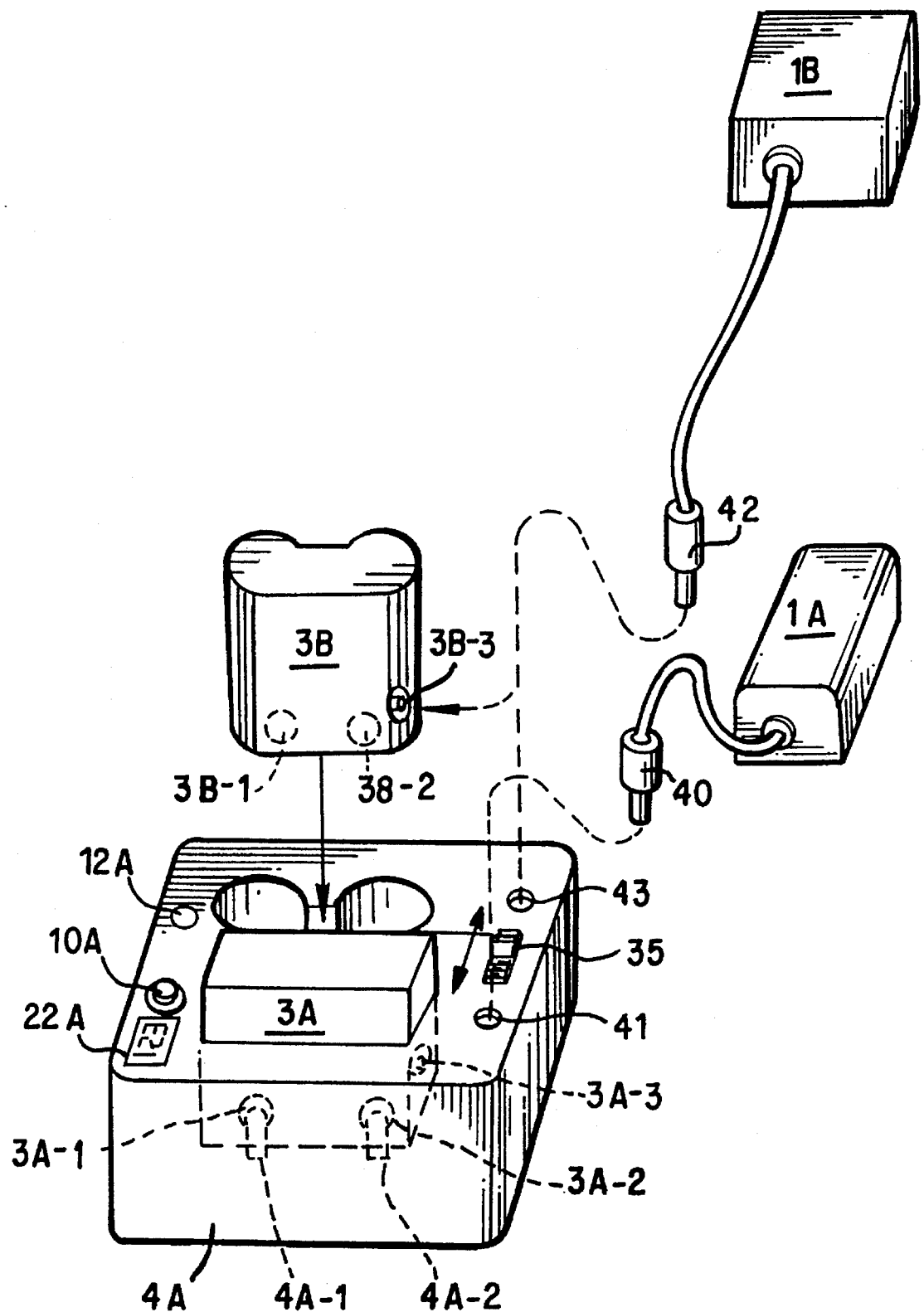
FIG. 3 is explanatory drawing showing the external appearance of an alternative preferred embodiment of the discharge adaptor described by this invention, as well as its usage.
Figure 4:
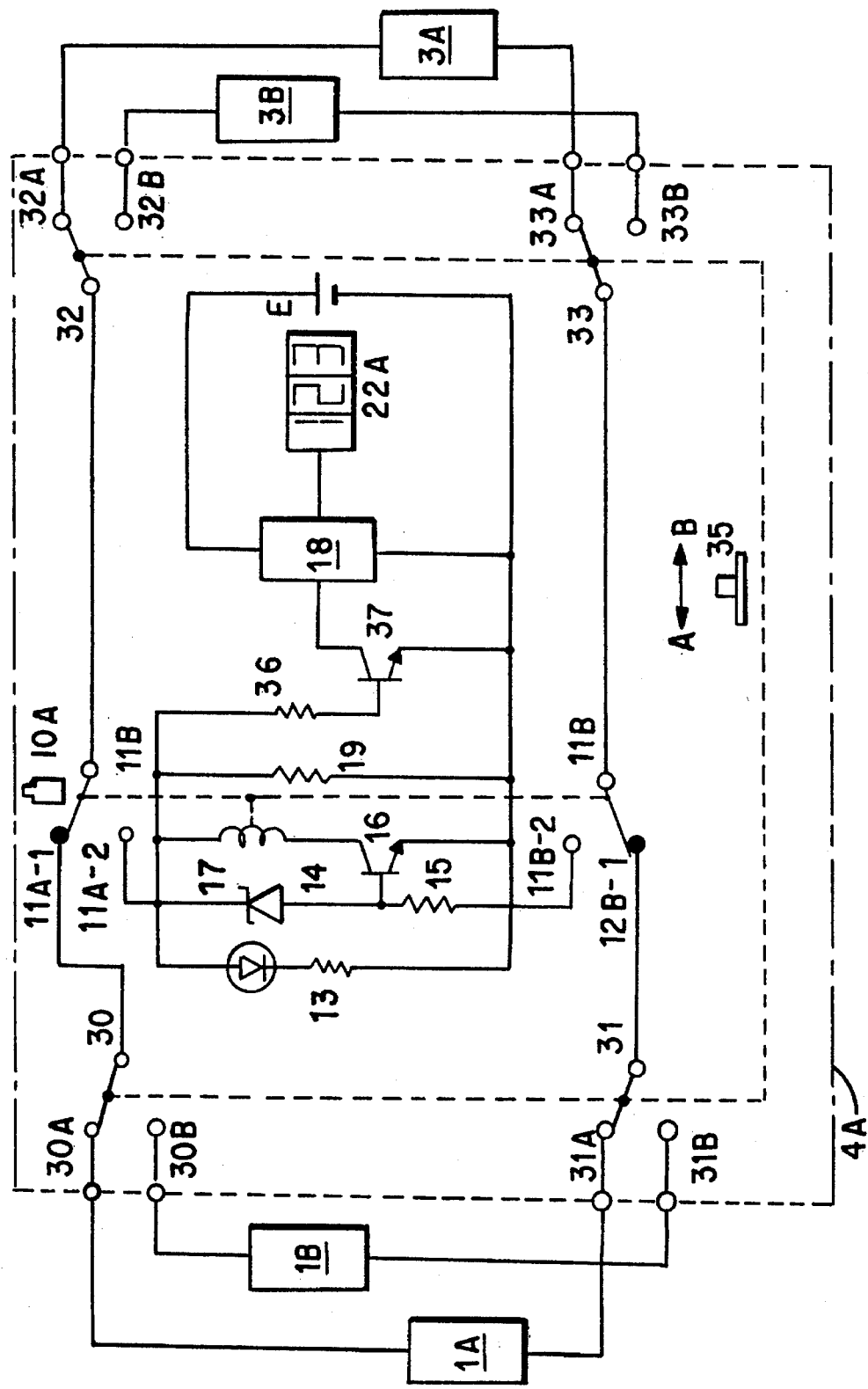
FIG. 4 is circuit diagram of the alternative preferred embodiment of the discharge adaptor shown in FIG. 3.

FIG. 3 shows the external appearance of an alternative second embodiment of the discharge adaptor. FIG. 4 shows the circuit diagram of the discharge adaptor shown in FIG. 3.

This alternative second embodiment of a discharge adaptor is configured so that, in certain cases, it may be used with two different types of batteries 3A and 3B and their respective exclusive-use recharging units 1A and 1B. When not using the discharge adaptor 4A that pertains to this invention, the batteries 3A and 3B shown in FIG. 3 are recharged by plugging the recharging cord of their respective exclusive-use recharging units into terminals 3A-3 and 3B-3. The discharge terminals 3A-1 and 3A-2 of battery 3A and 3B-1 and 3B-2 of battery 3B are all exclusive-use terminals for transferring the electric power out of their respective batteries. Because these terminals are directly connected to the positive and negative poles inside the battery, it is possible to electrically recharge the battery through the discharge terminals, the same as through terminals 3A-3 and 3B-3.

Thus, the discharge adaptor of this invention uses the method of discharge and recharging the two styles of battery, 3A and 3B, through the same terminals (the discharge terminals).

Discharge adaptor 4A is constructed so as to be able to accommodate either the recharging unit 1A and battery 3A in combination or the recharging unit 1B and battery 3B in combination. The desired combination is selected by SPDT switch 35.

Hence, the discharge adaptor 4A is provided with connectors 41 and 43 to receive the recharging cords 40 and 42 of each recharging unit 1A and 1B. When the SPDT switch 35 is operated, the connector 41 or 43 which accepts either one of the recharging cords, opens and becomes functional, while the other connector is covered and is not used.

The discharge adaptor 4A is equipped with an opening which contains receptacles formed to match the shapes of batteries 3A and 3B. This is because each secondary battery requires a specialized recharging unit based on its voltage and special characteristics, and if the wrong recharging unit is used, there is the danger of the battery being damaged or of accidents occurring. Furthermore, the connection between battery 3A and discharge adaptor 4A is accomplished through terminals 4A-1 and 4A-2 and discharge terminals 3A-1 and 3A-2 on battery 3A. Similarly, battery 3B is connected to discharge adaptor 4A through battery, and battery 3B is discharged through terminals 3B-1 and 3B-2 by terminals on discharge adaptor 4A, which are not shown in the drawing.

Again referring to FIG. 3, the receptacles that receive batteries 3A and 3B are constructed so that the discharge unit 4A may not be used when the recharging cords 40 and 42 of the recharging units 1A and 1B are directly connected to their respective recharging terminals 3A-3 and 3B-3. In other words, it is arranged so that batteries 3A and 3B absolutely cannot be inserted into the openings because of the recharging cords 40 and 42. This is not only so that the batteries may not be discharged while being recharged, but also because of the danger accompanying prolonged periods of heat output.

This discharge adaptor 4A is also equipped with a discharge commencement button 10A, an LED 12A, and a remaining capacity indicator 22A, similar to those in the previously described first embodiment.

FIG. 4 shows the circuit diagram of the discharge adaptor shown in FIG. 3. The basic operation of the circuit shown in FIG. 4 is similar to that of the circuit previously described in FIG. 2, and identical components are designated by the same reference numbers. The differences between the circuit in FIG. 4 and that of FIG. 3 are the switch used to select between the batteries 3A and 3B and their respective recharging units, the fact that the counter 18 is regulated through a transistor 37, and the fact that the remaining voltage indicator 22A consists of an electronic numerical indicator. Also, the counter 18 uses a separate battery (E) as its power source.

When using the discharge adaptor described above with recharging unit 1A and battery 3A, for example, the SPDT switch 35 is set to the A side. At that point, switches 30, 31, 32, and 33 switch to contact points 30A, 31A, 32A, and 33A, respectively. Simultaneously, connector 43, which accepts recharging cord 42, is closed off and it becomes impossible to insert recharging cord 42 into the receptacle.

In this condition, when the SPDT pushbutton 10A is depressed, SPDT switches 11A and 11B switch to 11A-2 and 11B-2, respectively, similar to the action of embodiment 1, described previously. Through this action, current starts to flow through the discharge circuit and the LED 12A lights up, signifying that the unit is in the process of discharging. Battery 3A begins discharging, primarily through resistor 19. While battery 3A has sufficient voltage, electric current flows through the zener diode 14 and to the base of the transistor 16, then passing through the transistor 16. From there, current flows through the electromagnetic switch coil 17, and SPDT switches 11A and 11B are self-maintained at contact points 11A-2 and 11B-2 through magnetic power. Thus, even after the discharge commencement button has been released, battery 3A electrically maintains the connection to the discharge circuit.

Simultaneously, when current passes through the transistor 37 via resistor 36, the timing action begins after the remaining capacity indicator 22A has reset to zero, similar to the action of embodiment #1. Thus, the remaining charge indicator 22A displays the discharging charge capacity corresponding to the elapsed discharging time as a numerical value.

When nearly all of the charge of battery 3A has been discharged, the voltage of the battery 3A decreases, the zener diode 14 no longer conducts, and the transistor 16 cuts off. Through this action, the flow of electric current through the coil 17 of SPDT switches 11A and 11B ceases. As a result, the SPDT switches 11A and 11B change from contact points 11A-2 and 11B-2 to contact points 11A-1 and 11B-1, respectively, through their self-returning power, and the discharge of battery 3A is completed. Transistor 37 no longer is conductive, and the timing action of counter 18 is stopped, as a result of which the remaining capacity of battery 3A remains displayed on the meter 22A. This value will remain displayed on the meter until the SPDT pushbutton is again depressed.

Power source E is the power source for the counter 18 and the remaining capacity display meter 22A and maintains the display of the meter 22A even after the discharging of battery 3A has been completed. If liquid crystal display elements are used in the meter, it is possible to use a small battery for power source E and still have the meter continue to display for a long period of time.

When SPDT switches 11A and 11B switch from contact points 11A-2 and 11B-2 to 11A-1 and 11B-1, battery 3A becomes connected to the recharging unit 1A. Thus, as in the case of embodiment #1, battery 3A is recharged, and an indicator (not shown) shows the commencement of recharging. When the charging action is finished, the indicator shows the completion of recharging, and one series of actions has been completed.

Now, if SPDT switch 35 is set to the B position on the right side of FIG. 4, switches 30, 31, 32, and 33 change to contact points 30B, 31B, 32B, and 33B, respectively, and the opening of connector 41 is covered. In this way, it is possible to use the combination of recharging unit 1B and battery 3B in the same way as described above.

As shown above, problems such as the memory effect and inactivity can be suitably resolved by this invention, even with recharging units which do not have a discharge function. In this case, it is unnecessary to buy a new recharging unit equipped with a discharge function. One may simply buy the discharge adaptor, which may be done without a substantial economic burden.

Also, since the remaining capacity indicator can indicate the battery's remaining capacity, it is possible to constantly monitor the life of the battery, thereby avoiding the potential problem of having the battery unexpectedly go dead in the middle of usage. Also, since the discharge adaptor of the present invention can automatically recharge the battery after discharging, in contrast to currently marketed units used exclusively for discharging, it is possible to properly manage the batteries, keeping them always charged and ready.

It is also known that ni-cad secondary batteries, when they naturally discharge after not being used for prolonged periods of time, emit gas in their interior, with the potential danger of exploding or of having their capacity decreased markedly. In order to overcome these types of problems, it is better to discharge ni-cad batteries if it is known beforehand that they will be unused for a long period of time.

When using this adaptor without connecting it to the recharging unit, it is possible to completely discharge the batteries and leave then uncharged, thereby eliminating such inconveniences.

The invention has been described with reference to preferred embodiments thereof, which are illustrative and not limiting. Various changes may be made without departing from the spirit and scope of the invention, as defined in the appended claims. For example, the discharge adaptor could be modified to discharge more than one battery at a time.

What is claimed is:

1. A battery discharge adaptor for discharging at least one battery, the adaptor removably connectable between a preexisting recharging unit and the at least one battery, comprising:
   a load discharge circuit for discharging the at least one battery;
   a discharge detector connected to the load discharge circuit that detects when the at least one battery is discharged; and
   a switch connected to the discharge detector having first positions connecting the at least one battery to the load discharge circuit and second positions connecting the at least one battery to the recharging unit.

2. The discharge adaptor of claim 1, wherein the switch automatically moves to the second positions when the discharge detector detects that the at least one battery is discharged.

3. The discharge adaptor of claim 1, further comprising a meter connected to the load discharge circuit that displays a remaining capacity of the at least one battery.

4. The discharge adaptor of claim 1, wherein the discharge detector cuts off a current flow to the switch when the at least one battery is discharged, causing the switch to move from the first positions to the second positions.

5. The discharge adaptor of claim 1, wherein the switch comprises a self-resetting electromagnetic switch.

6. The discharge adaptor of claim 1, wherein the switch connects a selected one of a plurality of batteries to the load discharge circuit in the first positions and to a corresponding recharging unit corresponding to the selected battery in the second positions.

7. The discharge adaptor of claim 1, further comprising a pushbutton that causes the switch to move from the second positions to the first positions when the pushbutton is depressed.

8. The discharge adaptor of claim 1, wherein the load discharge circuit includes an electric discharge resistor connected between a first terminal and a second terminal of the switch for discharging the at least one battery.

9. The discharge adaptor of claim 1, wherein the discharge detector comprises:
   a zener diode having a cathode connected to a first terminal of the switch;
   a resistor having a first end connected to an anode of the zener diode and a second end connected to a second terminal of the switch;
   a transistor having an emitter, a collector and a base, the emitter connected to the second terminal and the base connected to the first end of the resistor; and
   a coil having a first end connected to the collector of the transistor and a second end connected the first terminal.

10. The discharge adaptor of claim 1, further comprising an indicator lamp connected to the load discharge circuit for indicating when the at least one battery is discharging.

11. A battery discharge adaptor for discharging at least one battery, the adaptor removably connectable between a preexisting recharging unit and the at least one battery, comprising:
   load discharge means for discharging the at least one battery;
   discharge detector means connected to the load discharge means for detecting when the at least one battery is discharged; and
   switching means connected to the discharge means for connecting the at least one battery to one of the load discharge means and the recharging unit.

12. The discharge adaptor of claim 11, wherein the switching means automatically connects the at least one battery to the recharging unit when the discharge detector means detects that the at least one battery is discharged.

13. The discharge detector of claim 11, further comprising manual switching means for causing the switch to move from a second position connecting the at least one battery to the recharging unit to a first position connecting the at least one battery to the load discharge means.

14. The discharge adaptor of claim 11, further comprising counting and displaying means connected to the load discharge means for displaying a remaining capacity of the at least one battery.

15. The discharge adaptor of claim 11, wherein the switching means comprises a self-resetting electromagnetic switch.

16. The discharge adaptor of claim 11, further comprising selective connection means for connecting a selected one of a plurality of batteries to the load discharge means and to a corresponding recharging unit corresponding to the selected battery.

17. The discharge adaptor of claim 11, wherein the load discharge means includes an electric discharge resistor connected between a first terminal and a second terminal of the switching means.

18. The discharge adaptor of claim 11, wherein the discharge detector means comprises:
   a zener diode having a cathode connected to a first terminal of the switching means;
   a resistor having a first end connected to an anode of the zener diode and a second end connected to a second terminal of the switching means;
   a transistor having an emitter, a collector and a base, the emitter connected to the second terminal and the base connected to the first end of the resistor; and
   a coil having a first end connected to the collector of the transistor and a second end connected to the first terminal.

19. The discharge adaptor of claim 11, further comprising indicator means connected to the load discharge means for indicating when the at least one battery is discharging.

20. A method of discharging at least one battery comprising the steps of:
   removably connecting a discharge adaptor for discharging the at least one battery between a preexisting recharging unit and the at least one battery;
   discharging the at least one battery through a load discharge circuit within the adaptor;
   detecting when the at least one battery is discharged; and
   disconnecting the at least one battery from the load discharge circuit and connecting the at least one battery to the recharging unit with a switch contained within the adaptor.

21. The method of claim 20, further comprising the step of displaying a remaining capacity of the at least one battery on a meter disposed on the at least one adaptor.

22. The discharge adaptor of claim 20, further comprising the step of cutting off the current flow to the switch when the at least one battery is discharged, causing the switch to disconnect the at least one battery from the load discharge circuit and to connect the at least one battery to the recharging unit.

23. The method of claim 20, further comprising the step of lighting an indicator lamp disposed on the discharge adaptor when the at least one battery is discharging.

24. The method of claim 20, further comprising the step of manually causing the switch to move from a second position connecting the at least one battery to the load discharge circuit to a first position connecting the at least one battery to the load discharge circuit.

25. The method of claim 20, wherein the switch connects a selected one of a plurality of batteries to the load discharge circuit in a first position and to a corresponding recharging unit corresponding to the selected battery in a second position.

26. A battery discharger/charger system, comprising:
a battery recharger having an opening for a battery of a preselected shape, the opening having terminals corresponding to terminals in the battery for recharging the battery;
a battery discharge adaptor having a first side and a second side, the first side having a protrusion corresponding to the opening in the battery recharger for removably being inserted into the opening in the battery recharger and terminals corresponding to the terminals in the recharger, the second side having an indentation corresponding in shape to the preselected shape of the battery and terminals corresponding to the terminals in the battery;
circuit means connected to the terminals in the adaptor for discharging the battery, detecting when the battery is discharged and connecting the battery to the battery recharger without removing the battery from the indentation and the protrusion from the opening; and
means in the battery recharger for recharging the battery.

27. The battery discharger/recharger system of claim 26, further comprising a meter connected to the circuit means for displaying a remaining capacity of the battery.

28. The battery discharger/recharger system of claim 26, further comprising an indicator lamp for indicating when the battery is discharging.

29. A battery discharger/recharger system, comprising:
a battery discharge adaptor having at least two receptacles corresponding in shape to at least two different batteries, the receptacles having terminals corresponding to terminals on the batteries;
circuit means connected to the terminals in the receptacles for discharging a preselected one of the at least two batteries;
at least two connection terminals connected to the terminals in the receptacles and corresponding to the at least two batteries; and
at least two battery rechargers corresponding to the at least two batteries and having respective recharging cords for removable connection of one of the rechargers corresponding to the preselected battery to a corresponding one of the connection terminals.

30. The battery discharger/recharger system of claim 29, further comprising means for preventing an incorrect one of the recharging cords not corresponding to the preselected one of the at least two batteries from being connected to the connection terminals.

31. The battery discharger/recharger system of claim 29, further comprising a meter connected to the circuit means for displaying a remaining capacity of the preselected one of the at least two batteries.

32. The battery discharger/recharger system of claim 29, further comprising an indicator lamp for indicating when the selected one of the at least two batteries is discharging.

\* \* \* \* \*